United States Patent [19]

Arakawa

[11] Patent Number: 4,893,260

[45] Date of Patent: Jan. 9, 1990

[54] THREE-DIMENSIONAL GEOMETRY PROCESSING METHOD AND APPARATUS THEREFOR

[75] Inventor: Yoshiki Arakawa, Yawata, Japan

[73] Assignee: Matsushita Electric Industrial Company, Ltd., Kadoma, Japan

[21] Appl. No.: 145,084

[22] Filed: Jan. 19, 1988

[30] Foreign Application Priority Data

Jan. 19, 1987 [JP] Japan ................................. 62-9333

[51] Int. Cl.$^4$ ............................................. G06F 15/20
[52] U.S. Cl. ................................... 364/564; 364/522; 382/25; 382/28
[58] Field of Search ............... 364/564, 510, 518, 522, 364/735; 382/25, 28

[56] References Cited

U.S. PATENT DOCUMENTS

| | | | |
|---|---|---|---|
| 4,144,576 | 3/1979 | Mutton et al. | 364/564 |
| 4,608,709 | 8/1986 | Hedler et al. | 382/25 |
| 4,646,354 | 2/1987 | Naito et al. | 382/28 |
| 4,687,107 | 8/1987 | Brown et al. | 382/28 |
| 4,707,859 | 11/1987 | Nudd et al. | 382/28 |
| 4,730,261 | 3/1988 | Smith | 364/522 |
| 4,736,306 | 4/1988 | Christensen et al. | 364/513 |
| 4,766,556 | 8/1988 | Arakawa | 364/522 |

Primary Examiner—Parshotam S. Lall
Assistant Examiner—Christopher L. Makay
Attorney, Agent, or Firm—Cushman, Darby & Cushman

[57] ABSTRACT

Three dimensional solid geometry in an analysis domain is divided into primitives which are three dimensional solid geometry elements such as a parallelepiped, column or globe, and each primitive is divided into scanning lines having a predetermined thickness and being perpendicular to a reference plane of the analysis domain, then run-length which is represented by intersection of the scanning line and the primitive is calculated; the analysis domain is divided into cells, and a volume of the solid geometry which is occupied in each cell is calculated by intergration of the data of the run-lengths in the cell; moreover, a surface area of solid geometry is calculated by integration of intersection domains of the surface of the cell and the run-length, and finally a volume occupation ratio which is a ratio of the volume of the solid geometry and the volume of the cell is calculated, and in a similar manner an area occupation ratio which is a ratio of the surface area of the solid geometry and the surface area of the cell is calculated.

6 Claims, 12 Drawing Sheets

Scanning line

THREE-DIMENSIONAL GEOMETRY PROCESSING METHOD AND APPARATUS THEREFOR

FIELD OF THE INVENTION AND RELATED ART STATEMENT

1. Field of the Invention

The present invention relates to a processing method of three-dimensional geometry and an apparatus therefor for creating automatically geometric data in "an analysis domain" of numerical analysis or fluid analysis using a computer system.

2. Description of the Related Art

Recently, fluid analysis is occupying an important position in the field of design of an air craft, space craft, automobile or an air conditioner. A demand for the utilization of fluid analysis is rapidly increasing, and thus various methods of the fluid analysis have been developed in order to meet the demand.

One of these methods is a fluid analysis using "a finite difference method". In the finite difference method, geometric data in an analysis domain is created by a process as discussed in more detail hereafter referring to FIG. 9.

First, a solid geometry 10 for analyzing in an analysis domain is defined as shown in FIG. 9(a).

Second, the analysis domain is divided into suitable rectangular solids as shown in FIG. 9(b), and each rectangular solid as shown in FIG. 9(c) is commonly called a cell 11. The six surfaces enclosing the cell 11 are called cell planes. The cell planes which are perpendicular to X-axis, Y-axis and Z-axis are called cell X-planes 12, cell Y-planes 13 and cell Z-planes 14, respectively.

Third, portions occupying in common of the respective cells 11 and the solid geometry 10 are calculated. Then "a volume occupation ratio" representing a volume ratio of the solid geometry 10 in the cells 11 is calculated, and "area occupation ratios" representing area ratios of the solid geometry 10 occupying in common on the respective cell X-plane 12, cell Y-plane 13 and cell Z-plane 14 are calculated. As mentioned above, in the finite difference method, it is required to calculate "geometric occupation ratios" such as the volume occupation ratio and area occupation ratio with respect to the entire cells as a first step.

In order to calculate the geometric occupation ratio in the prior art, the geometric occupation ratios of the respective cells have been calculated by manual operation as shown in FIG. 9(d).

On the other hand, in case that the solid geometry is composed of rectangular solids and cylinders, for example, and is comparatively simple and regular, the geometric occupation ratios have been automatically calculated by an exclusive processing program. In the above-mentioned process, the rectangular solid cell 11 which is divided by perpendicular intersection (orthogonal coordinate) is used as the analysis cell.

As other cell division, an analysis cell which is divided by cell division on a cylindrical coordinate is usable as shown in FIG. 10(a). In the above-mentioned case, a cell is cylindrical such as "a cylindrical cell 15" which is a part of a cylinder as shown in FIG. 10(b). On the surfaces enclosing the cylindrical cell 15, a fan-shaped plane which is perpendicular to the Z-axis is called a cell Z-plane 16, a cylindrical surface wherein the rotational center is the Z-axis is called a cell r-plane 17 and a plane which is parallel to the Z-axis is called a cell $\theta$-plane 18.

Calculation of the geometric occupation ratios in the cylindrical cell 15 is especially difficult and involves complications in operation in comparison with the rectangular cell. Further, there is any disclosure on generally any universally usable tools for calculating the geometric occupation ratios in the cylindrical cell.

As mentioned above in the prior art, the geometric occupation ratios of only for the solid geometry which is restricted and comparatively simple are automatically calculated. Furthermore, in order to improve precision of analysis, since an analysis domain must be divided into smaller pieces, the number of cells in the analysis domain increases, and this results in an increase of the calculation time of the geometric occupation ratios. As a result, calculation of the geometric occupation ratios by manual operation or computation by the discrete exclusive processing program requires long times, and efficiency of calculation cannot be improved.

SUMMARY OF THE INVENTION

An object of the present invention is to provide a three-dimensional geometry processing method for automatically calculating geometric occupation ratios of various types of a three dimensional geometric solid with high precision and high speed, and an apparatus for accomplishing the method.

The three-dimensional geometry processing method in accordance with the present invention comprises the steps of:

defining a three dimensional geometry by a predetermined three dimensional coordinate system, dividing the three dimensional solid geometry into three dimensional solid geometry elements, storing data of the three dimensional solid geometry elements, setting a reference plane divided into a predetermined size of grids in the three dimensional coordinate system, setting scanning lines having a predetermined thickness and being perpendicular to the reference plane on the grid, obtaining a run-length representing intersection of the scanning line and the three dimensional solid geometry elements, storing data of the run-length, creating one run-length by combining plural run-lengths which have each other superimposing common part, storing cell data representing respective volumes of cells made by dividing analysis domain which encloses the three dimensional solid geometry, calculating a volume of the three dimensional solid geometry, which is represented by an integration of the run-lengths in the cell, by summing up the run-lengths and calculating occupation ratio of the volume of the cell and the volume of the solid geometry which is occupied in the cell.

According to the present invention, as shown in FIG. 2(a), an arbitrary three-dimensional solid geometry 20 (a cylinder, for example as shown in FIG. 2(a)) is approximately represented by an integration of data of each starting point 24 and end point 25 of run-length 23. The run-length is an intersection of the geometric solid 20 and a scanning line 22 having the predetermined thickness, as shown in FIG. 2(b). Scanning lines 22 are perpendicular to the respective divided grid elements on the reference plane 21. A volume and area of occupied portions of the geometric solid in the cell and cell plane thus obtainable by calculations of the intersection lines and intersection points of the run-length 23 and the analysis cell 26 and analysis cell plane 27, as shown in FIG. 2(c). Volume occupation ratio is calculated by dividing the volume of the geometric solid by the volume of the cell. Area occupation ratio is calculated by dividing an area of the geometric solid by an area of the cell plane.

Since the above-mentioned processes of the respective cells are accomplished in parallel, the calculating operations are shared by a plurality of microprocessor units (hereinafter is referred to as MPU). For example as shown in FIG. 2(c), the analysis domain 29 is divided into three portions 29A, 29B and 29C, and data of the respective domains 29A, 29B and 29C are processed by three microprocessor units MPU1, MPU2 and MPU3 (not shown), respectively. As a result of the parallel processing, the calculation times of the geometric occupation ratios can be significantly reduced. The processing speed can be increased in proportion to increase of number of MPU.

DESCRIPTION OF THE PREFERRED EMBODIMENT

Figure 1:
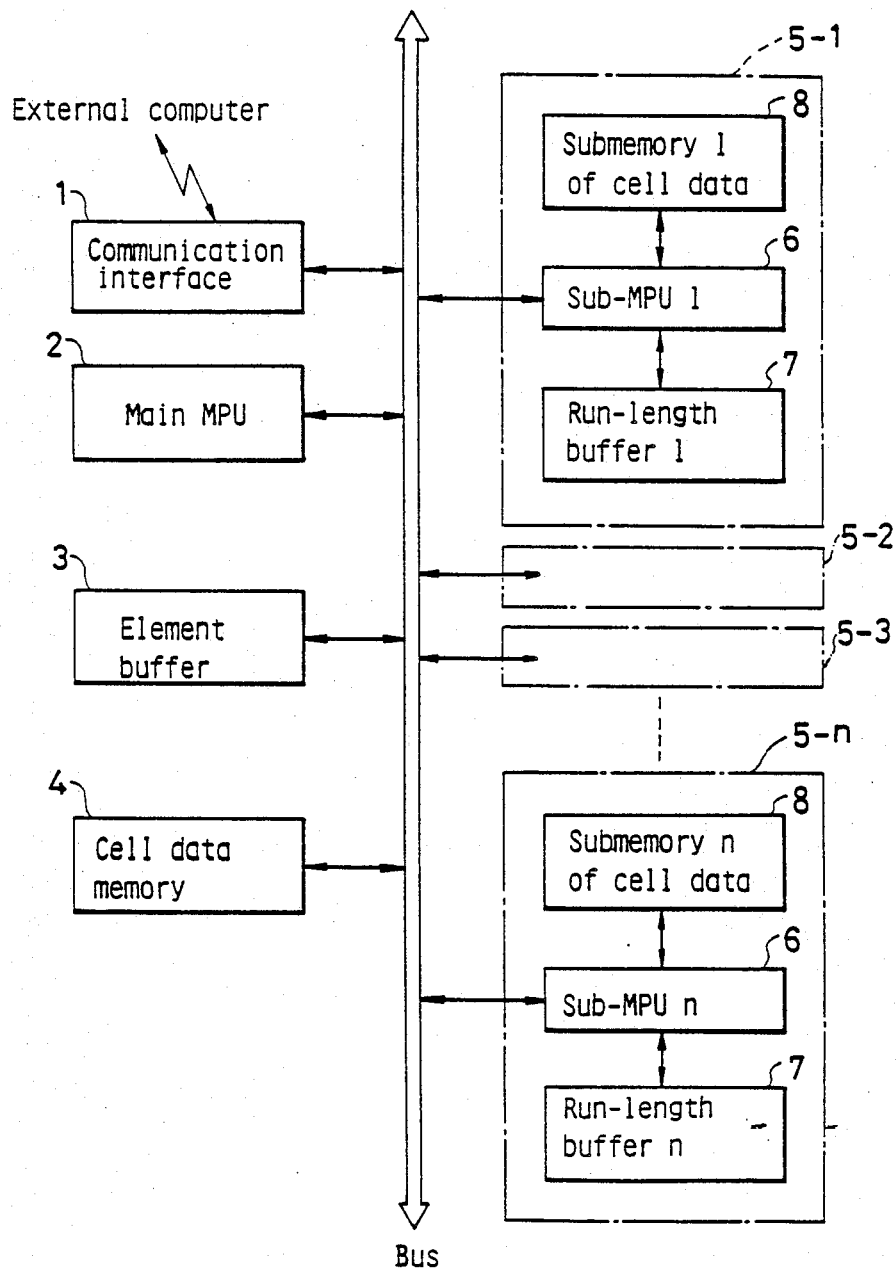
FIG. 1 is a block diagram of an embodiment in accordance with the present invention.

FIG. 1 is a block diagram showing a processing apparatus embodying the three-dimensional geometry processing method in accordance with the present invention. Referring to FIG. 1, a communication interface 1 receives primitive data (geometric data of three-dimensional shape, such as a rectangle, cylinder, cone or globe) which is inputted from an external apparatus, such as an external computer; communication interface 1 also transmits to the external apparatus data of geometric occupation ratios which are calculated by the apparatus. A main micro-processor unit 2 (hereinafter is referred to as MPU) controls the whole system of the apparatus. An element buffer 3 stores the primitive data which is inputted from the external apparatus. A cell data memory 4 stores cell division data. Plural calculation apparatus 5-1, 5-2 . . . 5-n for parallel calculating the geometric occupation ratios are provided, and each calculation apparatus 5 is composed of a sub-MPU 6 for calculating the geometric occupation ratios, a run-length buffer 7 for storing three-dimensional run-length data and a submemory 8 of the cell data for storing the geometric occupation ratios.

Figure 3A:
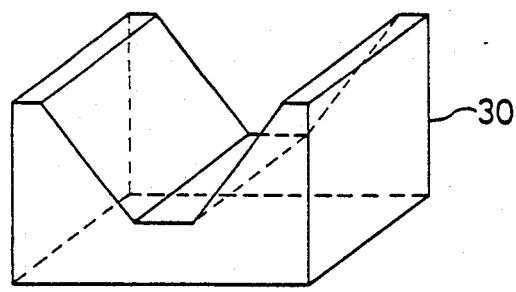
FIG. 3(a) is a perspective view showing an example of a solid geometry.
Figure 3B:
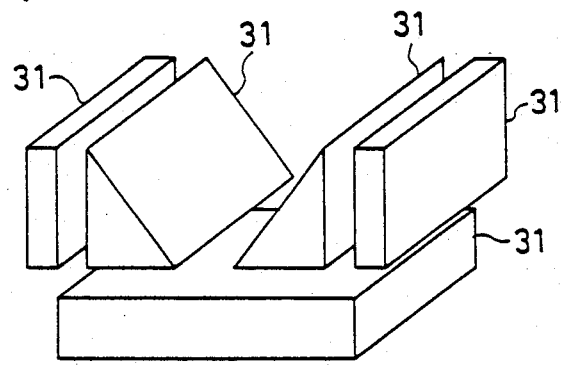
FIG. 3(b) is a perspective view of the solid geometry divided into primitives.

Operation of the processing apparatus is detailed hereinafter. A solid geometry 30 in an analysis domain as shown in FIG. 3(a) is defined by integration of a plurality of primitives 31 for geometric calculation of the respective primitives as shown in FIG. 3(b). Data of the defined primitives are stored in the element buffer 3 (FIG. 1) through the communication interface 1. On the other hand, cell division data, wherein the analysis domain is divided into analysis cells, and cell distribution data for distributing the cells to the calculation apparatus 5 are stored in the cell data memory 4 through the communication interface 1.

Figure 3C:
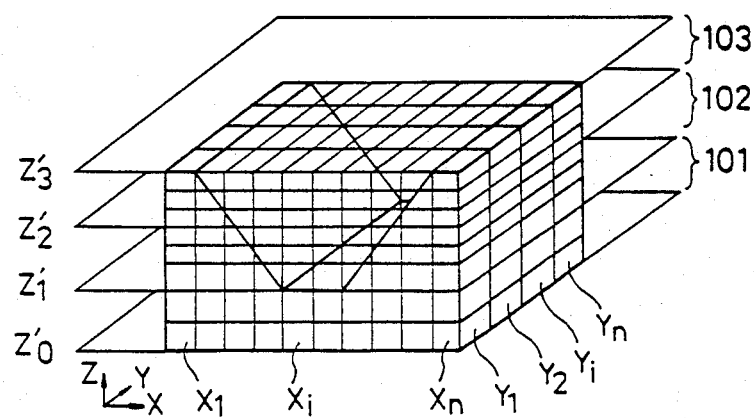
FIG. 3(c) is a perspective view showing the analysis domain divided into a plurality of cells.

In the embodiment as shown in FIG. 3(c), for example, the analysis domain is divided into three sub-domains 101, 102 and 103, and the respective sub-domains 101, 102 and 103 are assigned to the respective calculation apparatus 5-1, 5-2 and 5-3 as shown in FIG. 1.

The analysis domain is divided along the respective axis X, Y, Z of an orthogonal coordinate, and the divided part are called cells. The location of a cell is represented by cell division data $X_i$ ($i = 0, 1, 2 \ldots n_x$), $Y_i$ ($i = 0, 1, 2 \ldots n_y$) and $Z_i$ ($I = 0, 1, 2 \ldots n_z$). Cell division data $X_i$, $Y_i$, $Z_i$ are stored in the cell data memory 4. The cell distribution data $Z'_i$ ($i = 0, 1, 2 \ldots n$) representing the location of the subdomain is also stored in the cell data memory 4. The above-mentioned dividing of the analysis domain is made rough in the portion having simple shape of the solid geometry, and made finer in the portion having comparatively complex shape of the solid geometry.

In the embodiment, though division for cell distribution is made with respect to the Z-axis, the division may be made with respect to the X-axis or Y-axis.

Subsequently, cell data including the cell division data and cell distribution data is read out from the cell data memory 4, and the primitive data is also read out from the element buffer 3. Both sets of data are then input to the calculation apparatus 5 for calculating the geometric occupation ratios by control of the main MPU 2. In this step, the primitive data is input to the respective calculation apparatus 5, and the main MPU 2 assigns the cell division data to the respective calculation apparatus 5, on the basis of the cell distribution data. Namely, the cell division data $X_i$ ($i=0, 1, 2 \ldots n_x$), $Y_i$ ($I=0, 1, 2 \ldots n_y$)), $z_i$ ($Z'_{j-1} \leq Z_i \leq Z'_j$) are inputted to the calculation apparatus 5-j ($j=1, 2, \ldots n$).

Figure 11A:
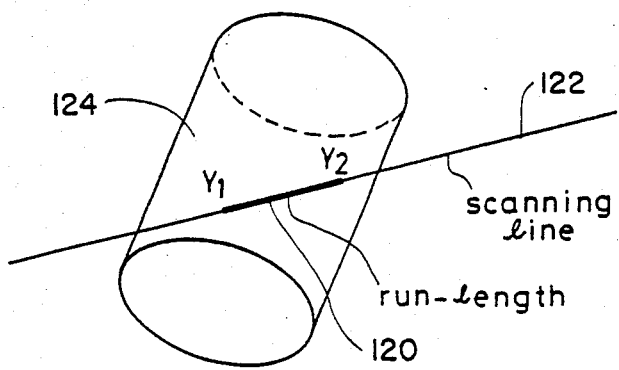
FIG. 11(a) is a perspective view showing run-length data formed by an intersection of a scanning line and a primitive.

Detailed step of the calculation apparatus 5 is described hereinafter. The cell division data input to the calculation apparatus 5 is stored in the submemory 8 of the cell data. Next, the primitive data is issued from the element buffer 3 in a predetermined order and is input to the respective calculation apparatus 5. The sub-MPU 6 of the calculation apparatus 5 receives the primitive data, and converts them into three-dimensional run-lengths representing intersection of the primitive and a scanning line which has a predetermined thickness and is perpendicular to a reference plane of the analysis domain. An example of a run-length is illustrated in FIG. 11(a): run-length 120 is formed as scanning line 122 passes through primitive 124, run-length 120 having end points $Y_1$ and $Y_2$. Three dimensional run-length data which is data of the run-length are stored in the run-length buffer 7 of the calculation apparatus 5.

Figure 4:
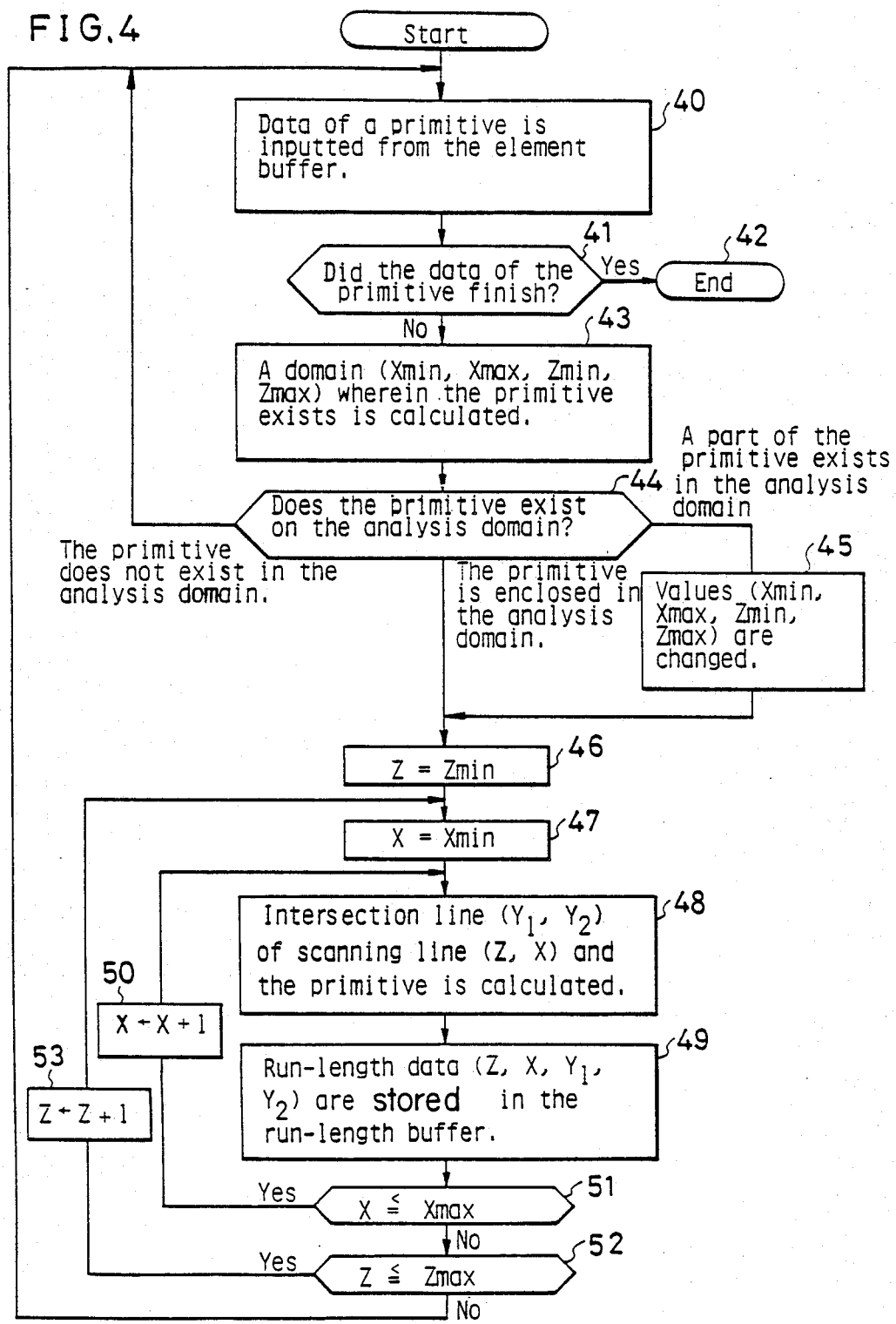
FIG. 4 is a flow chart for creating run-length data from the data of primitive.

The conversion process of the primitive data is detailed in the flow chart as shown in FIG. 4. In the embodiment, a direction of scanning line conforms to the Z-axis.

Firstly, primitive data is input to the sub-MPU 6 from the element buffer 3 (Step 40 of FIG. 4). After the last primitive data is processed, the step goes to "end"(Steps 41 and 42). Range of X-coordinate $X_{min}$-$X_{max}$ and range of Z-coordinate $Z_{min}$-$Z_{max}$ wherein the primitive exists are calculated (Step 43). By calculating the X-coordinate and Z-coordinate ranges for the primitive data, the location of the primitive with respect to the reference plane (x-z plane) is thus determined.

Second, the range of the X-coordinate $X_{min}$-$X_{max}$ and range of Z-coordinate $Z_{min}$-$Z_{max}$ are compared with the analysis domain stored in the sub-MPU 6 (Step 44), and if the primitive does not exist at all in the analysis domain, next primitive is input. If only a part of the primitive exists in the analysis domain, the values of the X-coordinate $X_{min}$ and $X_{max}$ and Z-coordinate $Z_{min}$ and $Z_{max}$ are changed so that the values of the X-coordinate and Z-coordinate are restricted in the analysis domain (Step 45). If all of the primitive is enclosed in the analysis domain, the process goes to the next step.

Third, the location of intersection line ($Y_1, Y_2$) of the scanning line (Z, X) and the primitive are calculated (step 48) after detection of intersection points $Y_1$ and $Y_2$ by conventional methods. The run-length data (Z, X, $Y_1$, $Y_2$) are stored in the run-length buffer 7 (Step 49). In this step, the run-length data are compared with the previous run-length data which has been stored in the run-length buffer 7 in a preceding step, and when both the data overlap with each other, both the data are combined into one run-length data. The above-mentioned process for converting a primitive to the run-length data is performed with respect to all primitives.

Figure 5:
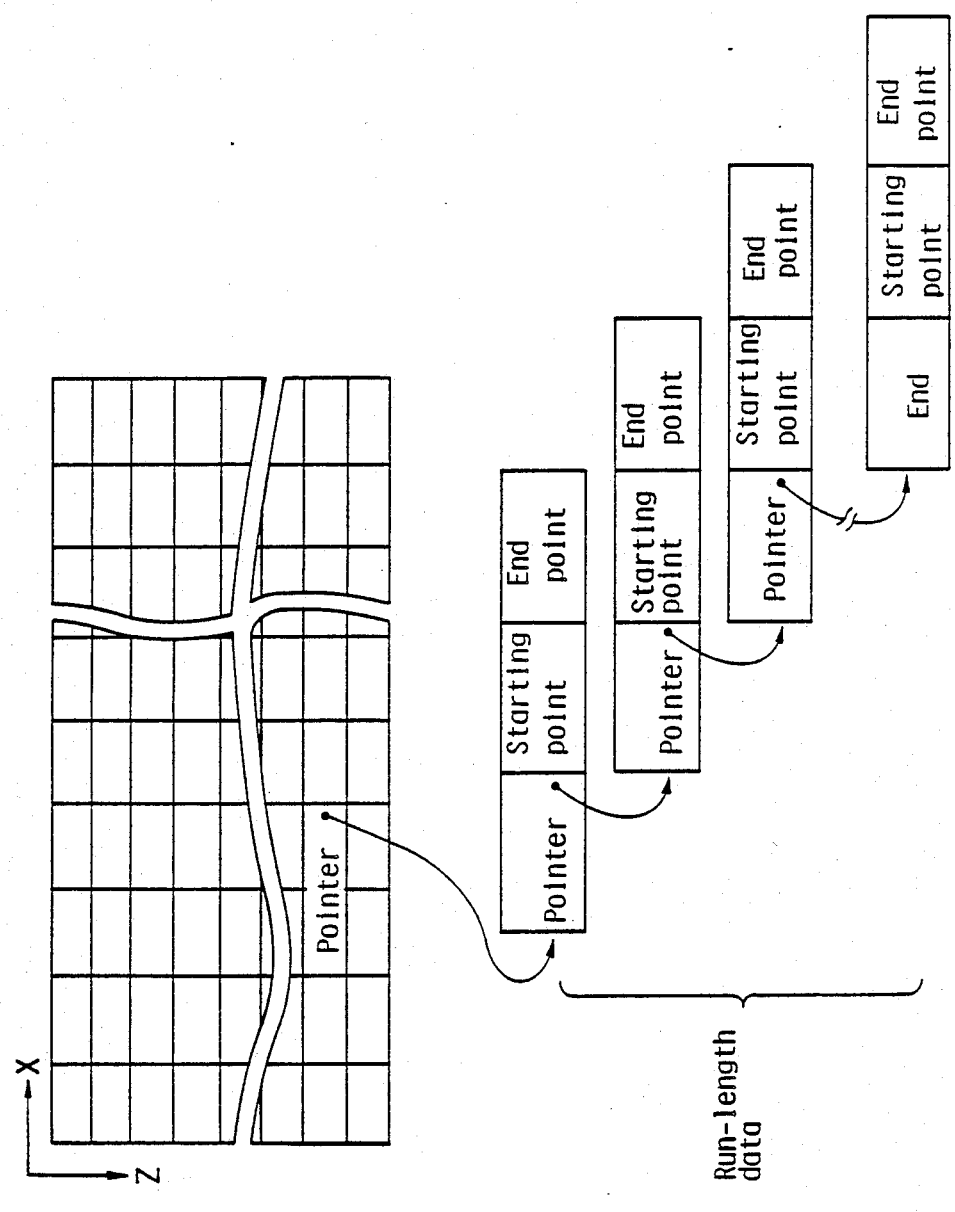
FIG. 5 is detailed data structure of the run-length data.

The run-length data structure obtained in this way is stored in the run-length buffer 7 as shown in FIG. 5.

Since the data structure is represented by list structure data having a fixed length, the data structure is suitable for processing by a computer with high operating efficiency and high speed processing.

Figure 2A:
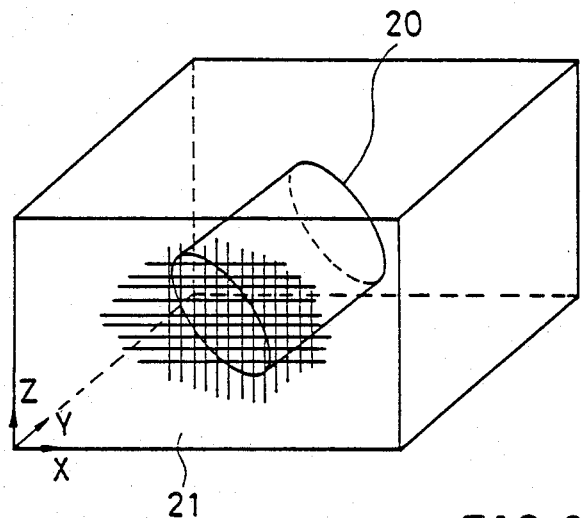
FIG. 2(a) is a perspective view showing three-dimensional run-length in an analysis domain.
Figure 2B:
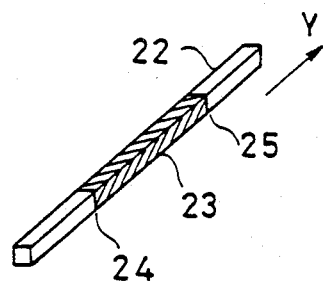
FIG. 2(b) is a perspective view of a scanning line.
Figure 2C:
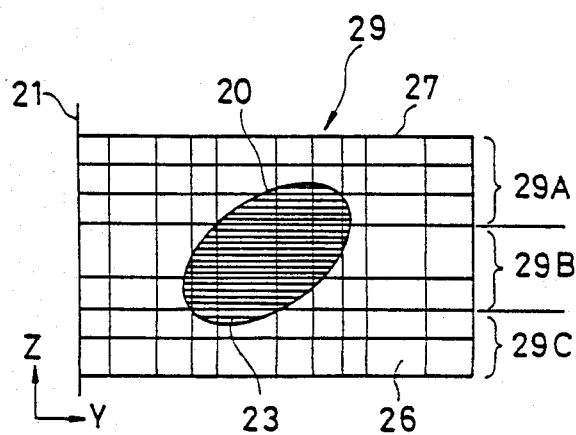
FIG. 2(c) is a side view showing a way of dividing the analysis domain into cells.
Figure 6:
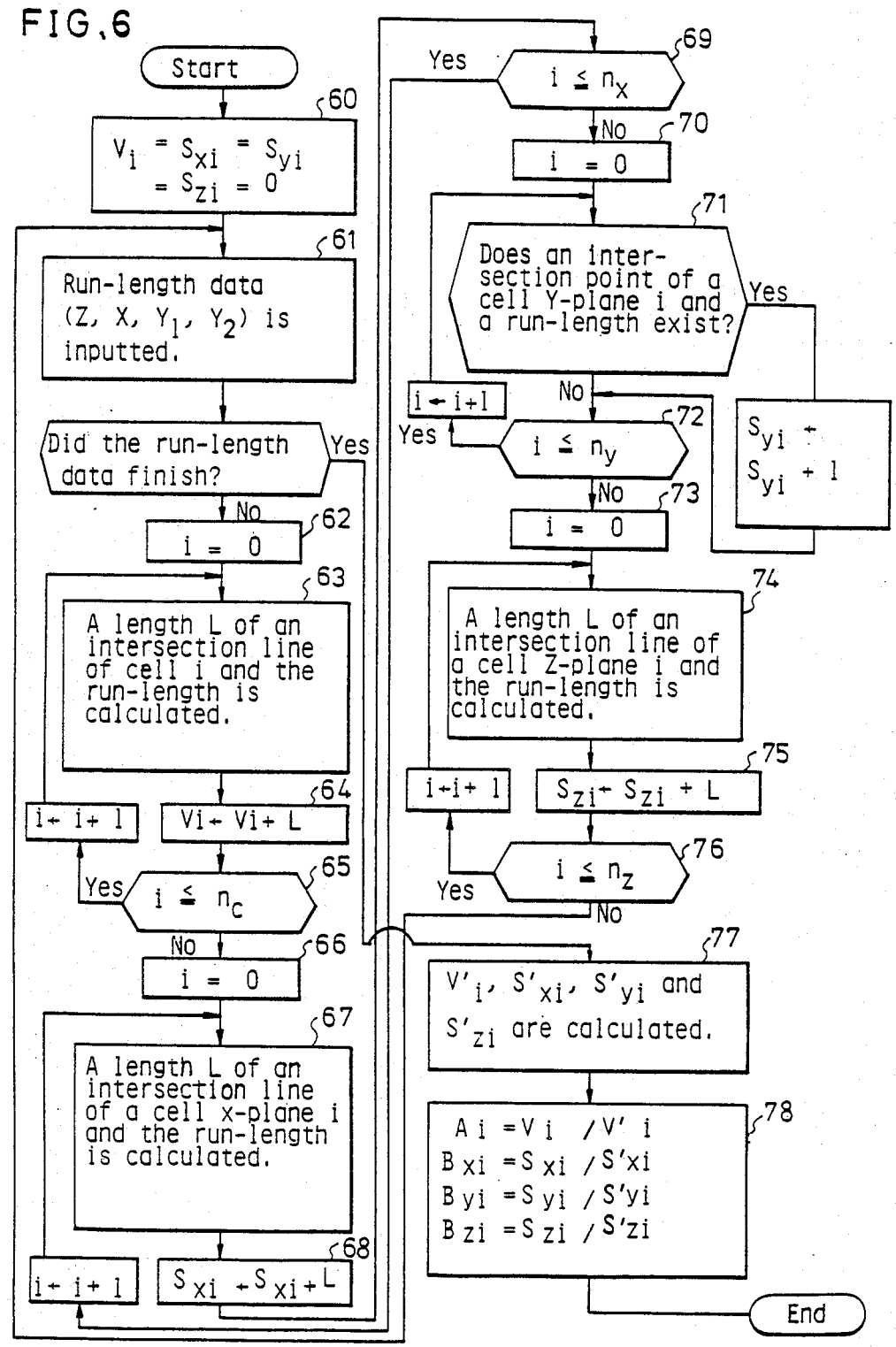
FIG. 6 is a flow chart for calculating geometric occupation ratios from the run-length data in an orthogonal coordinate system of the embodiment of the present invention.

In the subsequent step, a geometric occupation ratio is calculated from the run-length data as shown in FIG. 6. As illustrated in FIG. 2(b), since scanning line 22 has a predetermined thickness, the thickness can be defined so that the intersection of scanning line 22 with a plane results in an area equal to a predetermined value, such as an area unit value of 1; further, the thickness of scanning line 22 can be defined in three dimensions so that intersection of a portion L of scanning line 22 in a volume V results in an intersection volume having a value of L.

First, an initial state is set (Step 60) so as to make all the following values zero: volume $V_i$ ($i=0, 1, 2 \ldots n_c$) which the solid geometry occupies in a cell i ($i=0, 1, 2, \ldots n_c$); area $S_{xi}$ ($i=0, 1, 2, \ldots n_x$) which is made by intersection of the solid geometry on a cell X-plane i; $S_{yi}$ ($i=0, 1, 2, \ldots, n_y$) which is made by intersection of the solid geometry on a cell Y-plane i; and $S_{zi}$ ($i=0, 1, 2, \ldots, n_z$) which is made by intersection of the solid geometry on a cell Z-plane i.

Figure 11B:
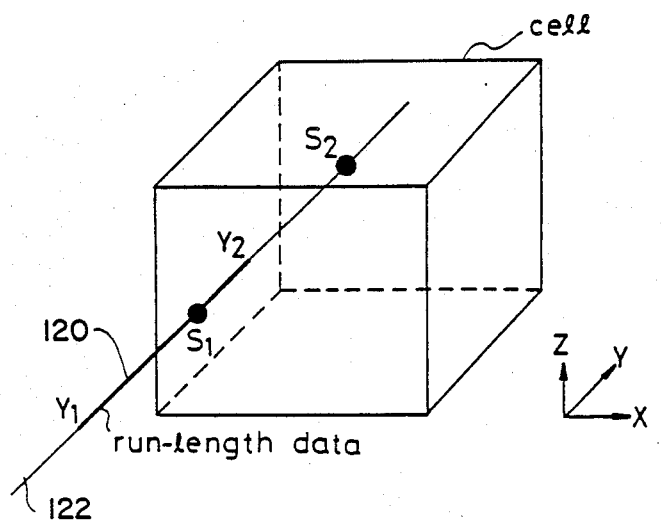
FIG. 11(b) is a perspective view showing run-length data partially passing through a cell of the analysis domain.

Second, run-length data (Z, X, $Y_1$, $Y_2$) is input (Step 61). After the last run-length data is processed, the step goes to step 77. When the run-length data exists, intersections of each cell i ($i=0, 1, 2, \ldots, n_c$) and corresponding run-length data (Z, X, $Y_1$, $Y_2$) are examined. FIG. 11(b) illustrates scanning line 122 passing through cell i at points $S_1$ and $S_2$: run-length data 120 intersects cell i from points $S_1$ to $Y_2$. When cell i intersects with the run-length 120, each length L of the line intersected by the cell i is calculated, and the resultant value is added to the volume $V_i$ (Steps 62, 63, 64 and 65). Furthermore, in the case where scanning line 122 lies in cell X-plane i, intersection of all the cell X-plane i ($i=0, 1 \ldots n_x$) and the run-length (Z, X, $Y_1$, $Y_2$) are examined. When the cell X-plane i intersects with run-length 120, each length L of the intersection line is calculated, and the resultant value is added to an area $S_{xi}$ (Steps 66, 67, 68 and 69). (In the embodiment, it is provided that the cell X-plane is in parallel with run-length 120.)

Subsequently, intersection of all the cell Y-plane i ($i=0, 1, \ldots n_y$) and the run-length (Z, X, $Y_1$, $Y_2$) are examined. And, when the cell Y-plane i intersects with run-length 120, a numerical value "1" representing a number of an unit thickness of run-length 120 is added to an area $S_{yi}$ (It is provided that the run-length is perpendicular to the cell Y-plane) (Steps 70, 71 and 72).

Moreover, in the case where scanning line 122 lies in cell Z-plane i, intersections of whole the cell Z-plane i ($i=0, 1, \ldots n_z$) and the run-lenth (Z, X, $Y_1$, $Y_2$) are examined, and when the cell Z-plane i intersects with run-length 120, the length L of the intersection line of the cell Z-plane i and run-length 120 is calculated and the resultant value is added to area $S_{zi}$ (It is provided that the run-length 120 is parallel with the cell Z-plane) (Steps 73, 74, 75 and 76). Above-mentioned steps from the step 61 to step 76 are performed for all the run-lengths. As a result, an occupying volume $V_i$ of the solid geometry in the cell i, an occupying area $S_{xi}$ of the solid geometry in the cell X-plane i, an occupying area $S_{yi}$ of the solid geometry in the cell Y-plane i and an occupying area $S_{zi}$ of the solid geometry in the cell Z-plane i are obtained.

Further, the following values are calculated for the unit analysis cell i using known geometric formulas for surface and volume: a volume $V'_i$ of the cell i, an area $S'_{xi}$ of the cell X-plane i, an area $S'_{yi}$ of the cell Y-plane i and an area $S'_{zi}$ of the cell Z-plane i (Step 77). Then, a geometric occupation ratio $A_i$ of the cell i, a geometric occupation ratio $B_{xi}$ of the cell X-plane i, a geometric occupation ratio $B_{yi}$ of the cell Y-plane i and a geometric occupation ratio $B_{zi}$ of the cell Z-plane i are calculated (Step 78).

In the embodiment, the analysis cell is a parallelepiped. Therefore, all the surfaces of the cell are planes, and therefore, manner of intersections of the plane and the run-length are defined by intersections of a straight line and a plane. Therefore, the geometric occupation ratio can be calculated by repetition of the above-mentioned very simple process.

Another embodiment is described hereinafter referring to FIG. 7. In the embodiment, the analysis cell is cylindrical, but constitution of the apparatus is identical with that of the preceding embodiment shown in FIG. 1.

Figure 7A:
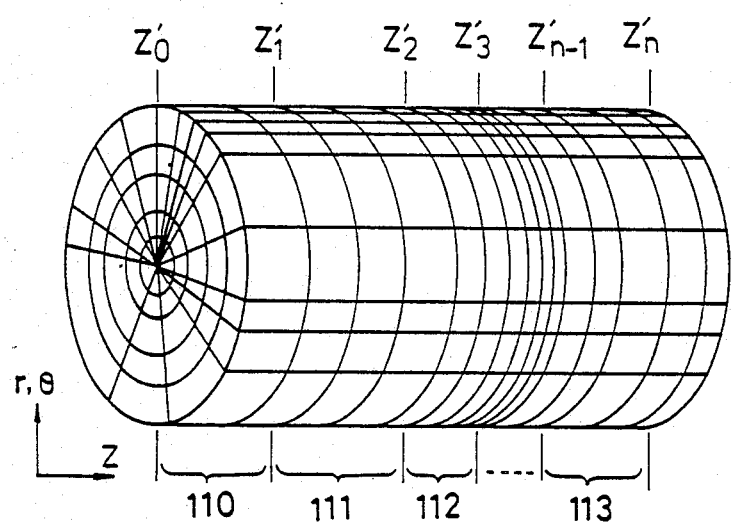
FIG. 7(a) is a perspective view showing an analysis domain divided into cells in a cylindrical coordinate.

In the embodiment of FIG. 7(a), the analysis domain is divided into a plurality of subdomains 110, 111, 112 and 113 as shown in FIG. 7(a), and the respective subdomains are assigned to the calculation apparatus 5-1, 5-2, 5-3 ... 5-n, respectively.

Cell deivision data $Z_i$ (i=0, 1, 2, ... $n_z$), $r_i$ (i=0, 1, 2, ... $n_r$) and $\theta_i$ (i=0, 1, 2, ... $n_\theta$), and cell distribution data $Z_i$, $r_i$, $\theta_i$ are stored in the cell data memory 4. The cell division data $Z_i$ and cell distribution data $Z'_i$ (i=0, 1, 2, ... n) are inputted to the calculation apparatus 5. Thereby, three dimensional run-length data of the respective subdomains are created from the primitive data, and the geometric occupation ratios in the respective cell are calculated from the three dimensional run-length data in a similar manner to the preceding embodiment. Since the first half process of the embodiment is identical with that of the preceding embodiment, detailed description of the operation is omitted.

Figure 7B:
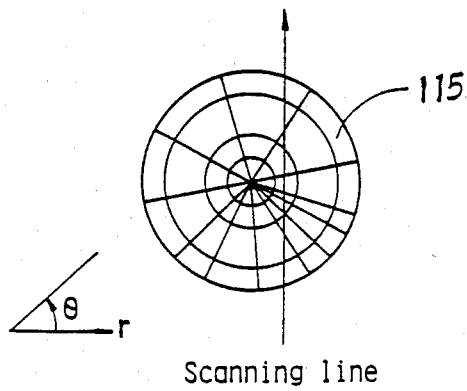
FIG. 7(b) is a side view of the analysis domain in the cylindrical coordinate.
Figure 8:
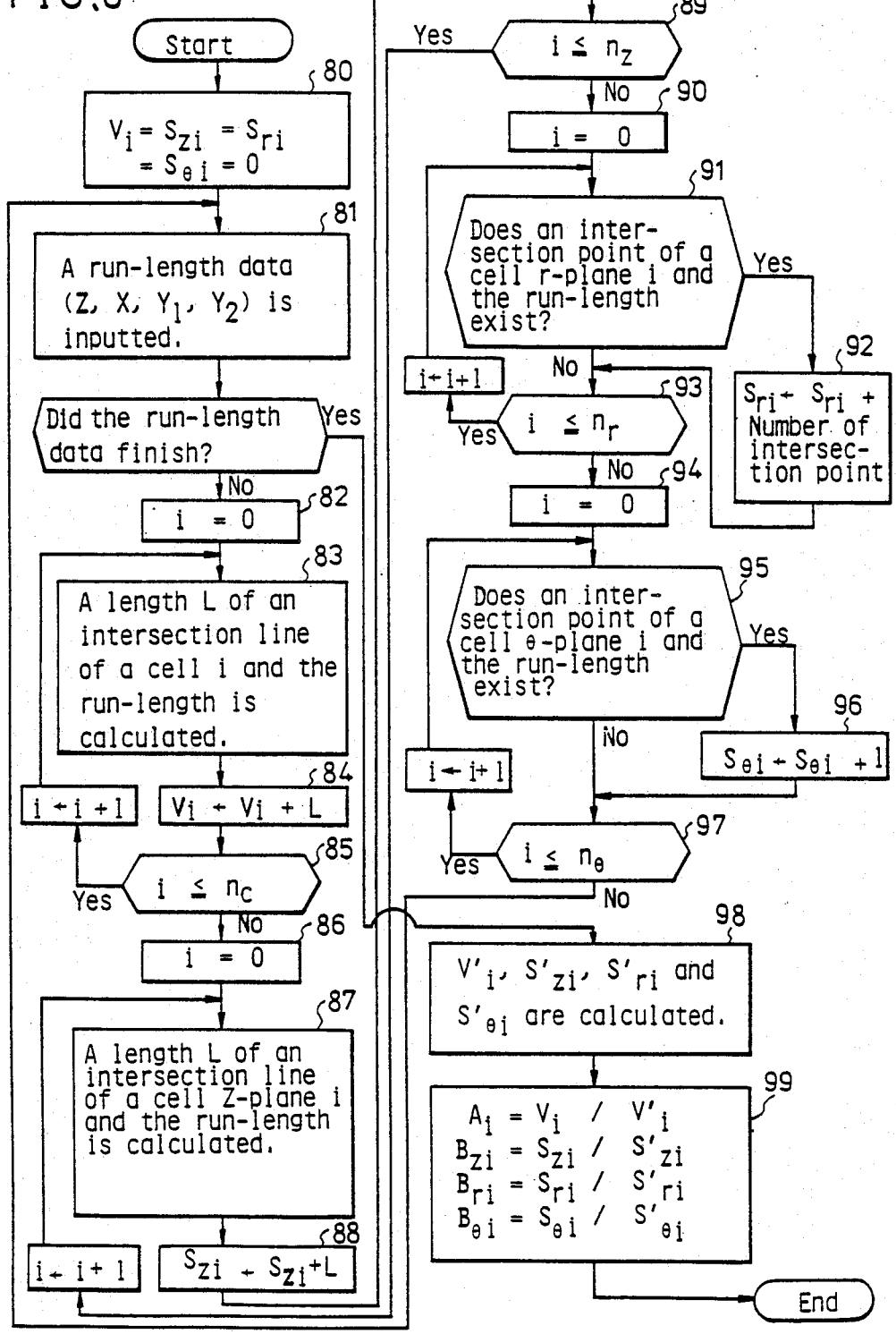
FIG. 8 is a flow chart for calculating the geometric occupation ratios from the run-length data in the cylindrical coordinate system of an embodiment of the present invention.
Figure 9A:
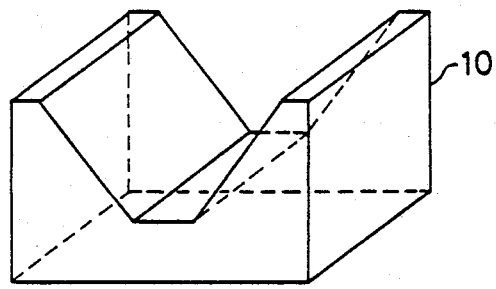
FIG. 9(a) is perspective view showing the solid geometry in the prior art.
Figure 9B:
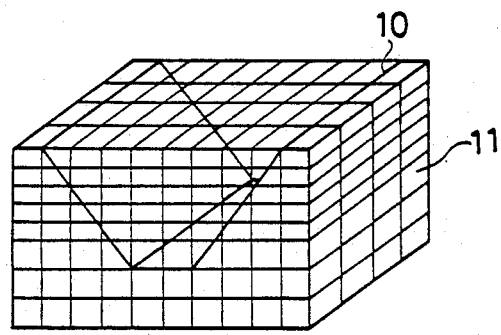
FIG. 9(b) is the perspective view showing the analysis domain divided into cells in the prior art.
Figure 9C:
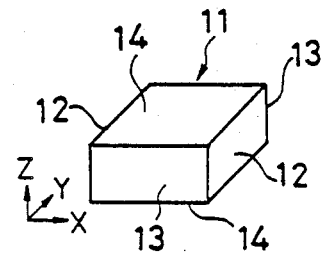
FIG. 9(c) is a perspective of a cell.
Figure 9D:
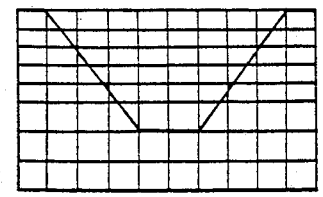
FIG. 9(d) is the front view of the analysis domain in the prior art.
Figure 10A:
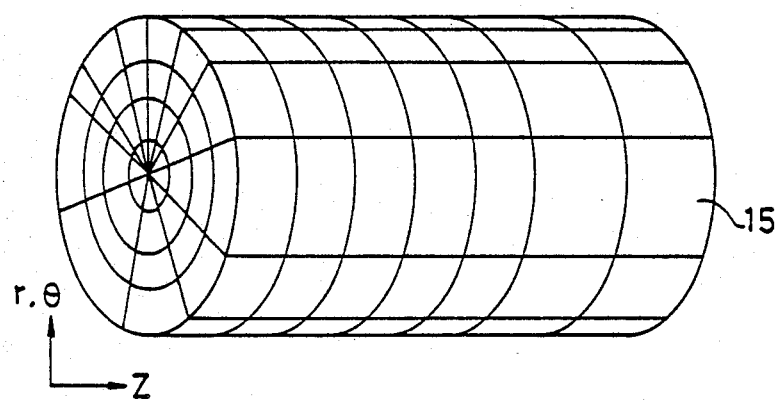
FIG. 10(a) is the analysis domain divided into cells of the cylindrical solid geometry in the prior art.
Figure 10B:
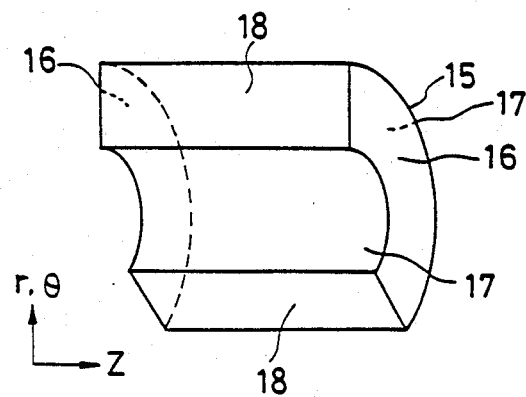
FIG. 10(b) is the perspective view showing the cell of the cylindrical solid geometry.

Calculation of the geometric occupation ratios of the cylindrical cell is described referring to a flow chart of FIG. 8. The calculations in the cylindrical coordinate system follow the same methodology as the first embodiment with minor variations to compensate for the differences between the cylindrical and orthogonal coordinate systems. In the embodiment, the direction of the scanning line is taken perpendicular to the Z axis and is on a R-$\theta$ plane 115 as shown in FIG. 7(b). Therefore, the geometry occupation ratios are calculated from intersection of a straight line (run-length) and a straight line on the cell $\theta$-plane and from intersection of the straight line (run-length) and a circular arc on the cell R-plane. The scanning line can be selected in a direction which is different from that of the above-mentioned embodiment.

Figure 12A:
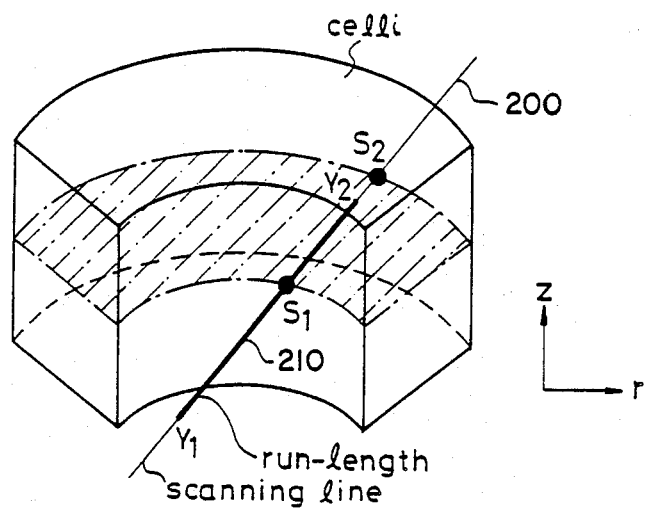
FIG. 12(a) is a perspective view showing run-length data partially passing through a cell of the cylindrical analysis domain.
Figure 12B:
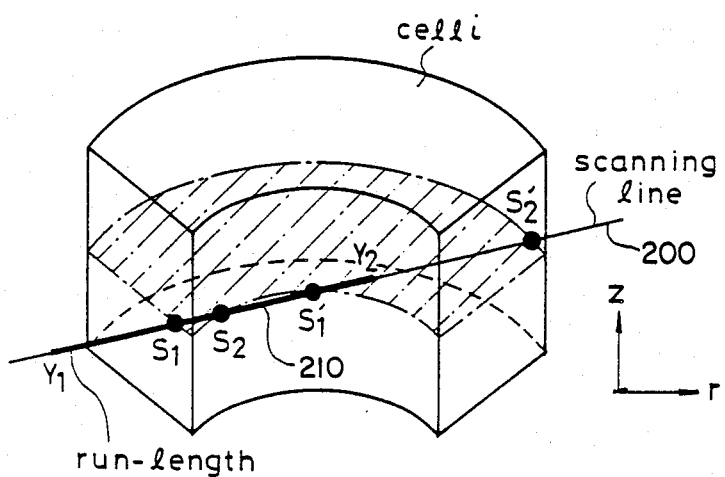
FIG. 12(b) is a perspective view showing run-length data forming two intersections through a cell of the cylindrical analysis domain.

An occupying volume $V_i$ (i=0, 1, 2, ... $n_c$) of the solid geometry in a cell i, an intersection area $S_{zi}$ (i=0, 1, 2, ... $n_z$) of the solid geometry and a cell Z-plane i, an intersection area $S_{ri}$ (i=0, 1, 2, ... $n_r$) of the solid geometry and a cell R-plane i and an intersection area $S_{\theta i}$ (i=0, 1, 2, ... $n_\theta$) of the solid geometry and a cell $\theta$-plane i are set in an initial state "zero" (Step 80). Subsequently, run-length data (Z, X, $Y_1$, $Y_2$) is inputted from the run-length buffer 7 in a predetermined order (Step 81). After the last data was processed, the step goes to a step 98. FIG. 12(a) and FIG. 12(b) illustrate scanning line 200 and run-length 210 passing through cylindrical cell i. In FIG. 12(b), scanning line passes through cell i twice, thus having four intersection points $S_1$, $S_2$, $S_1'$ and $S_2'$. Intersections of all the cell i (i=0, 1, 2, ... $n_c$) and the run-length (Z, X, $Y_1$, $Y_2$) are examined, and when the run-length intersects with the cell i, a length L of the intersection line between the run-length and the cell i is calculated, and the resultant value is added to the volume $V_i$ (Steps 82, 83, 84 and 85). Furthermore, intersection of the run-length (Z, X, $Y_1$, $Y_2$) and all the cell Z-plane i (i=0, 1, 2, ... $n_z$) are examined. In the case were scanning line 200 lies in the cell Z-plane i, run-length 210 intersects with the cell Z-plane i, the length L of the intersection line between the run-length and the cell Z-plane i is calculated, and the resultant value is added to the area $S_{zi}$ (Steps 86, 87, 88 and 89) (It is provided that the cell Z-plane is in parallel) with the run-length). Subsequently, intersection of the cell R-plane i (i=0, 1, 2, ... $n_R$) and the run-length (Z, X, $Y_1$, $Y_2$) are examined. And, when the run-length intersects with the cell R-plane i, a numerical value "1" or "2" of intersection points is added to an area $S_{ri}$, depending on whether scanning line intersects cell i as shown in FIG. 12(a) or FIG. 12(b) (Steps 90, 91, 92 and 93). Moreover, intersections of the cell $\theta$-plane i (i=0, 1, 2, ... $n_\theta$) and the run-length (Z, X, $Y_1$, $Y_2$) are examined. And, when the cell $\theta$-plane i intersects with the run-length, a numerical value "1" is added to an area $S_{\theta i}$ (Steps 94, 95, 96 and 97). The steps from step 81 to step 97 are performed of all the run-lengths, and thereby, all the volume $V_i$, areas $S_{zi}$, $S_{ri}$ and $S_{\theta i}$ are calculated.

Subsequently, the following values are calculated for the unit cylindrical analysis cell i using known geometric formulas for surface and volume: a volume $V'_i$ (i=0, 1, 2, ... $n_c$) of the cell i, an area $S'_{zi}$ (i=0, 1, 2, ... $n_z$) of the cell Z-plane i, an area $S'_{ri}$ (i=0, 1, 2, ... $n_r$) of the cell R-plane i and an area $S'_{\theta i}$ (i=0, 1, 2, ... $n_\theta$) of the cell $\theta$-plane i (Step 98). Finally, a volume occupation ratio $A_i$ of the cell i, an area occupation ratio $B_{zi}$ of the cell Z-plane i, an area occupation ratio $B_{ri}$ of the cell R-plane i and an area occupation ratio $B_{\theta i}$ of the cell $\theta$-plane i are calculated (Step 99).

In general fluid analysis, in the above mentioned two embodiments, values which subtract the respective occupation ratios $A_i$, $B_{xi}$, $B_{yi}$, $B_{zi}$, $B_{ri}$ and $B_{\theta i}$ from 1, as shown in equations (3) are used:

$$\left.\begin{array}{rcl} A'_i & = & 1 - A_i \\ B'_{xi} & = & 1 - B_{xi} \\ B'_{yi} & = & 1 - B_{yi} \\ B'_{zi} & = & 1 - B_{zi} \\ B'_{ri} & = & 1 - B_{ri} \\ B'_{\theta i} & = & 1 - B_{\theta i} \end{array}\right\} \quad (3)$$

where, the value $A'_i$ is called fluid occupation ratio and the values $B'_{xi}$, $B'_{yi}$, $B'_{zi}$, $B'_{ri}$ and $B'_{\theta i}$ are called "porosity" in the fluid analysis field.

According to the present invention, since the solid geometry is represented by the run-length data, arbitrary three dimensional solid geometry is easily represented. Furthermore, the geometric occupation ratios in cylindrical coordinate system as well as orthogonal coordinate system can be automatically calculated with high precision and high speed by repetition of simple geometric processing. Moreover, data structure of the run-length in accordance with the present invention is feasible for parallel processing, and processing time can be reduced proportional to the number of the microprocessor unit.

What is claimed is:

1. A three dimensional geometry processing method comprising the steps of:
    defining a three dimensional geometry by a predetermined three dimensional coordinate system,
    dividing said three dimensional solid geometry into three dimensional solid geometry elements with respect to the predetermined three dimensional coordinate system,
    storing data of said three dimensional solid geometry elements,
    setting a reference plane divided into a predetermined grid size in said three dimensional coordinate system,
    setting scanning lines having a predetermined thickness and being perpendicular to said reference plane on said grid,
    obtaining a run-length representing an intersection of said scanning line and said three dimensional solid geometry elements,
    storing data of said run-length,
    creating one run-length by combining superimposing plural run-lengths,
    storing cell data representing respective all volumes made by dividing an analysis domain which encloses said three dimensional solid geometry,
    calculating a volume of said three dimensional solid geometry, which is represented by an integration of said run-length in said cell, and
    calculating an occupation ratio of said volume of said cell and said volume of said solid geometry which is occupied in said cell.

2. A three dimensional geometry processing method comprising the steps of:
    defining a three dimensional geometry by a predetermined three dimensional coordinate system,
    dividing said three dimensional solid geometry into three dimensional solid geometry elements with respect to a predetermined three dimensional coordinate system,
    storing data of said three dimensional solid geometry elements,
    setting a reference plane divided into a predetermined grid size in said three dimensional coordinate system,
    setting scanning lines having a predetermined thickness and being perpendicular to said reference plane on said grid,
    obtaining a run-length representing an intersection of said scanning line and said three dimensional solid geometry elements,
    storing data of said run-length;
    creating one run-length by combining a plurality of run-lengths having superimposing common parts,
    storing cell data representing respective surface areas of a cell made by dividing an analysis domain which encloses said three dimensional solid geometry,
    calculating areas of said three dimensional geometry, which is represented by an integration of crossing domains of surfaces of said cell and said run-length in said cell, and
    calculating an occupation ratio of said area of said cell and an area of said solid geometry being occupied on said surface of said cell.

3. A three dimensional geometry processing apparatus comprising:
    a memory for storing data of said three dimensional solid geometry being divisions of a three dimensional solid geometry with respect to a predetermined three dimensional coordinate system,
    means for setting a reference plane divided into a predetermined size of grid in said three dimensional coordinate system,
    means for setting scanning lines having a predetermined cross-sectional area and being perpendicular to said reference plane on said grid,
    means for producing a run-length being represented by an intersection of said scanning line and said three dimensional solid geometry elements,
    a memory for storing said run-length,
    means for creating one run-length by combining a plurality of superimposing run-lengths,
    a memory for storing cell data representing a volume and surface area of a cell divided in an analysis domain enclosing said three dimensional solid geometry,
    means for calculating a volume of said three dimensional solid geometry represented by an integration of said run-length data in said cell,
    means for calculating an area of said three dimensional solid geometry being represented by an integration of crossing domains of surfaces of said cell and run-lengths in said cell,
    means for calculating a volume occupation ratio being a ratio of said volume of the cell and said volume of the solid geometry being occupied in said cell, and
    means for calculating an area occupation ratio being a ratio of said area of the cell and said area of the solid geometry being occupied on said surface of the cell.

4. A three dimensional geometry processing apparatus in accordance with claim 3, wherein
    a plurality of said respective means for generating run-length data and for calculating said volume, area, volume occupation ratio and area occupation ratio are provided to operate in parallel.

5. A three dimensional geometry processing apparatus in accordance with claim 3, wherein
    a plurality of said memory for storing said run-length and a plurality of said respective means for calculating said volume, area, volume occupation ratio and area occupation ratio are provided to operate in parallel.

6. A three dimensional geometry processing apparatus in accordance with claim 3, wherein
    said means for calculating said volume, area, volume occupation ratio and area occupation ratio are made by a plurality of microprocessors.

* * * * *